B. J. GREELY.
Suspender-Ends.

No. 9,155. Reissued April 13, 1880.

Witnesses.
L. F. Connor.
Jos. P. Livermore

Inventor.
Benjamin J. Greely,
by Crosby Gregory, Attys.

N. PETERS, PHOTO-LITHOGRAPHER, WASHINGTON, D. C.

UNITED STATES PATENT OFFICE.

BENJAMIN J. GREELY, OF BOSTON, MASSACHUSETTS.

SUSPENDER-END.

SPECIFICATION forming part of Reissued Letters Patent No. 9,155, dated April 13, 1880.

Original No. 209,559, dated November 5, 1878. Application for reissue filed February 25, 1880.

*To all whom it may concern:*

Be it known that I, BENJAMIN J. GREELY, of Boston, county of Suffolk, and State of Massachusetts, have invented a certain new and useful Improvement in Suspender-Ends, of which the following is a full, clear, and exact description, reference being had to the accompanying drawings, making a part hereof.

My improvement consists in a suspender-end in which the loop is secured by a sheet-metal fastening device, which when formed about the cords resembles two connected cylinders, one surrounding each part of the cord, which, held in loop form, constitutes the button-hole part.

Each half of the sheet-metal fastening device has a cord-entering prong struck up or formed as a part of it, which enters and holds the cord, so that it cannot slip out from the fastening device.

Figure 1:
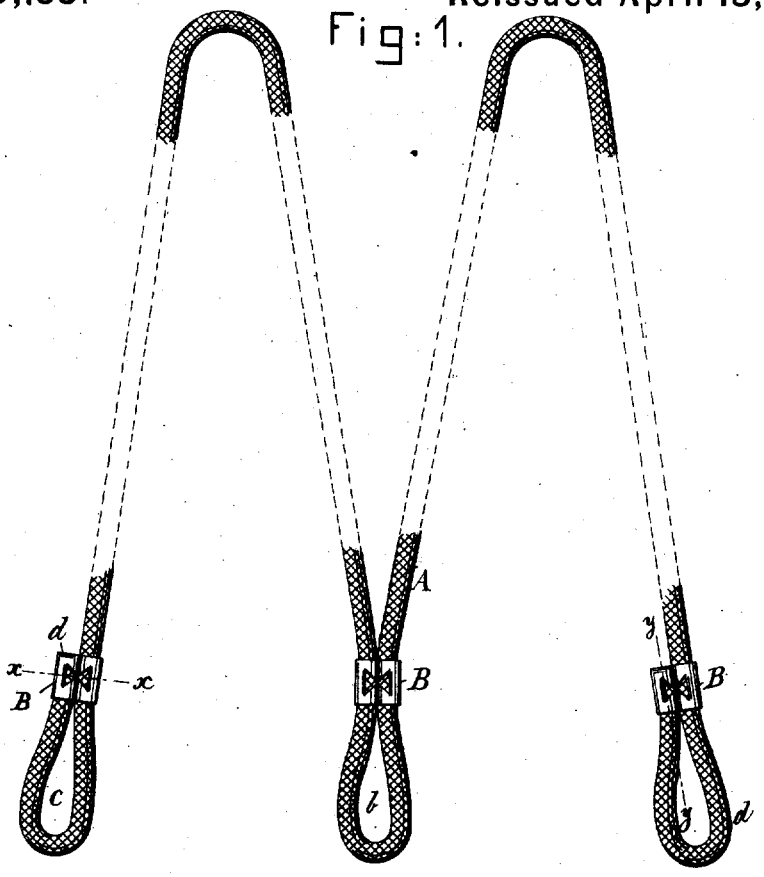
Figure 2:
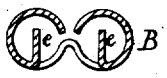
Figure 3:
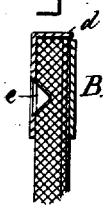

Figure 1 represents one of my suspender-ends, it being composed of cord bent and fastened to form three loops to serve as button-holes. Fig. 2 is a section on the line *x x*, the cord being omitted; Fig. 3, a section on the line *y y;* Fig. 4, the blank to produce the fastening for the loop at the middle of the cord, and Fig. 5 the blank for the fastening device at the ends of the cord.

The suspender-end is composed of a cord, A, of suitable size and length, folded at its center to form a center loop, *b*, and at each end to form end loops, *c d*. The parts of the cord composing the said loops are held together by fastening devices B, cut and formed from sheet-metal blanks, as shown at Figs. 4 and 5, the blank represented in Fig. 5 differing from that in Fig. 4 only in having at one of its edges the end-covering lip *d*, to cover and inclose the end of the cord.

Figure 4:
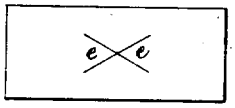
Figure 5:
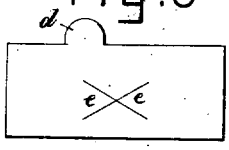

Each blank is cut as shown in Figs. 4 and 5 and turned at right angles to the main body of the blank to form prongs *e e*, which, when the blank is subsequently folded about the cord, as shown, penetrate and hold the cord firmly in place.

The fastening devices B are applied by means of proper dies, which lap them closely about the contiguous portions of the cord, forming, as it were, two connected parallel cylinders. (See Fig. 2.)

The ear *d* is bent over the end of the cord (see Fig. 3) to cover the end of the cord at the end loops.

The prongs *e* are herein shown as so cut that their flat sides are in the direction of the width of the blank, the said prongs being thereby adapted to penetrate the cord more nearly in the direction of its length than if they were cut to occupy a position at right angles to their present position.

The suspender-end above described is very simple and cheap, and its loops are very strong because of being bound together by the sheet-metal fastening.

The fastening device B, made to embrace parallel portions of the cord, and provided with prongs to enter the said cord, constitutes a very complete and durable holding device for the loops.

I do not broadly claim a suspender-end formed of a loop and a metallic device for holding the parts together, as I am aware that that is old.

I claim—

1. As an improved article of manufacture, a suspender-end composed of the cord A, folded at or near its center, and held together by a sheet-metal fastening device to form a central loop, and bent into loop form at each end and secured by fastening devices, thus making in the cord three loops, all substantially as described.

2. The cord bent upon itself at its end to form a loop, combined with the sheet-metal fastening device B, provided with cord-penetrating prongs struck from the sheet metal, the fastening device being applied about the two contiguous parts of the cord-loop and bent to form two connected cylinders, each of which contains one member of the cord-loop, the prongs penetrating the cord, substantially as described.

3. In a suspender-end composed of cord, the combination, with the end loop, of the sheet-metal fastening device provided with cord-penetrating prongs and with the cord-covering lip, substantially as set forth.

4. A suspender-end composed of a cord doubled or returned to form a button-hole, and secured in button-hole or loop shape by a metallic clasp having, when applied, the form substantially of a double or two connected hollow cylinders, each one containing and holding one member of the said cord-loop, substantially as described.

BENJAMIN J. GREELY.

Witnesses:
G. W. GREGORY,
L. F. CONNOR.